United States Patent
Harter, Jr. et al.

(10) Patent No.: US 7,230,523 B2
(45) Date of Patent: Jun. 12, 2007

(54) VEHICULAR REAR VIEW MIRROR/VIDEO DISPLAY

(75) Inventors: Joseph E. Harter, Jr., Kokomo, IN (US); Gregory K. Scharenbroch, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 143 days.

(21) Appl. No.: 11/031,232

(22) Filed: Jan. 7, 2005

(65) Prior Publication Data
US 2006/0164220 A1 Jul. 27, 2006

(51) Int. Cl.
*B60Q 1/00* (2006.01)
(52) U.S. Cl. .................. 340/425.5; 340/436; 340/438; 340/937; 359/838; 359/842
(58) Field of Classification Search ............. 340/425.5, 340/436, 438, 461, 903, 907, 937; 348/118, 348/143, 148, 153, 169; 359/549, 609, 631, 359/838, 842; 382/107, 219
See application file for complete search history.

(56) References Cited

U.S. PATENT DOCUMENTS

| 5,303,205 A | 4/1994 | Gauthier et al. ............. 367/108 |
| 5,414,439 A | 5/1995 | Groves et al. .................. 345/7 |
| 5,670,935 A | 9/1997 | Schofield et al. ........... 340/461 |
| 5,793,308 A | 8/1998 | Rosinski et al. ............. 340/903 |
| 5,940,120 A * | 8/1999 | Frankhouse et al. .......... 348/61 |
| 5,956,181 A | 9/1999 | Lin |
| 6,304,173 B2 | 10/2001 | Pala et al. ................... 340/461 |
| 6,420,975 B1 * | 7/2002 | DeLine et al. ........... 340/815.4 |
| 6,690,262 B1 | 2/2004 | Winnett ....................... 340/7.1 |
| 6,727,807 B2 | 4/2004 | Trajkovic et al. ........... 340/436 |
| 6,819,231 B2 * | 11/2004 | Berberich et al. .......... 340/435 |
| 2002/0080018 A1 | 6/2002 | Yamazaki |

FOREIGN PATENT DOCUMENTS

| DE | 19741896 | 4/1999 |
| JP | 11078693 | 3/1999 |
| WO | 0218174 | 3/2002 |

OTHER PUBLICATIONS

EP Search Report dated Jan. 24, 2007.

* cited by examiner

*Primary Examiner*—Hung Nguyen
(74) *Attorney, Agent, or Firm*—Jimmy L. Funke

(57) ABSTRACT

A rear view mirror/video display includes a one-way mirror and a selectively activated video display that is mounted immediately behind the one-way mirror so that the driver is presented with a typical semi-obstructed rearward view when the video display is deactivated, and an unobstructed rearward view of substantially the same size and aspect ratio when the video display is activated. The video image is obtained from an imaging device mounted to capture a rearward field-of-view that is unobstructed by vehicle body panels but otherwise corresponds in content with that of the image reflected by the one-way mirror. Activation and deactivation of the video display may be manual, but is preferably automatic based on vehicle operating conditions.

4 Claims, 1 Drawing Sheet

VEHICULAR REAR VIEW MIRROR/VIDEO DISPLAY

TECHNICAL FIELD

The present invention relates to a viewing apparatus for presenting the driver of a vehicle with a view rearward of the vehicle, and more particularly to an apparatus including a video imaging device, a mirror and a selectively activated video display.

BACKGROUND OF THE INVENTION

Various arrangements have been suggested for presenting the driver or passengers of a motor vehicle with video images obtained from one or more video cameras mounted on the vehicle. Frequently, the objective is to provide the driver a view that is superior to that which is available with conventional inside and outside rear view mirrors. For example, a video camera may be mounted to produce a rear view image that is unobstructed by any portion of the vehicle body. In some instances, the video display is attached to, or incorporated into, a conventional rear view mirror housing; see for example, the U.S. Pat. No. 6,690,268 to Schofield et al. In other cases, the video display is incorporated into the instrument panel, or provided as a head-up display in the case of infrared imaging; see for example, the U.S. Pat. No. 5,414,439 to Groves et al.

While widely known, video display devices have not enjoyed any substantial usage in production vehicles, except in busses, recreational vehicles, and the like, where a view immediately rearward of the vehicle cannot be obtained with an inside rear view mirror. Accordingly, what is needed is an apparatus for displaying rearward-directed video images that can be cost-effectively implemented in a vehicle and easily used by drivers accustomed to using a conventional rear view mirror.

SUMMARY OF THE INVENTION

The present invention is directed to an improved rear view mirror/video display in which a selectively activated high brightness video display is mounted immediately behind a one-way mirror so that the driver is presented with a typical semi-obstructed reflected rearward view when the video display is deactivated, and with an unobstructed rearward view of substantially the same size and aspect ratio when the video display is activated. The video image is obtained from an imaging device mounted to capture a rearward field-of-view that is unobstructed by vehicle body panels but otherwise corresponds in content (i.e., field-of-view) with the scene that is reflected to the driver by the one-way mirror. Activation and deactivation of the video display may be manual, but is preferably automatic based on vehicle operating conditions.

DESCRIPTION OF THE PREFERRED EMBODIMENT

Figure 1:
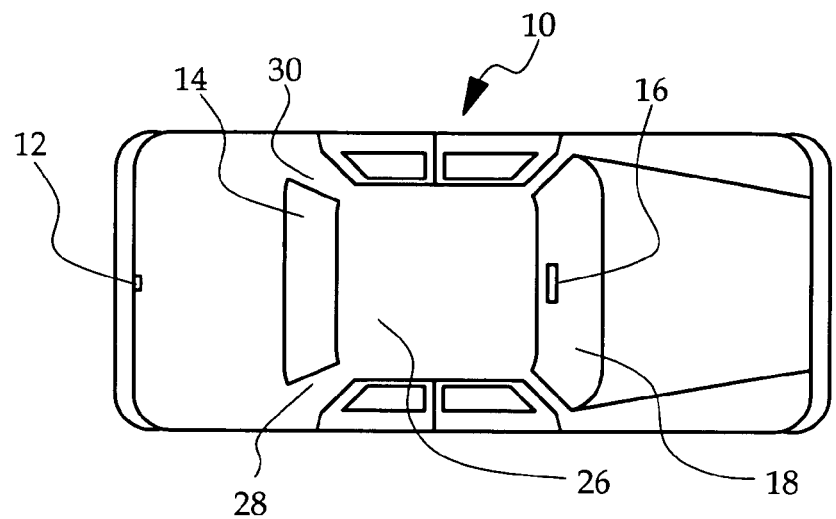
FIG. 1 depicts an overhead view of a vehicle, including an imaging device and a rear view mirror/video display according to the present invention.

Referring to FIG. 1, the reference numeral 10 generally designates a sedan-type vehicle equipped with a rear view apparatus according to this invention. An imaging device 12 such as a CCD camera is centrally mounted near the rear of the vehicle 10, and a rear view display apparatus 16 is centrally mounted on or above the windshield 18. The rear view display apparatus 16 is mounted in the same manner as a conventional rear view mirror, enabling manual adjustment of its orientation to suit the seated height of the driver.

Figure 2:
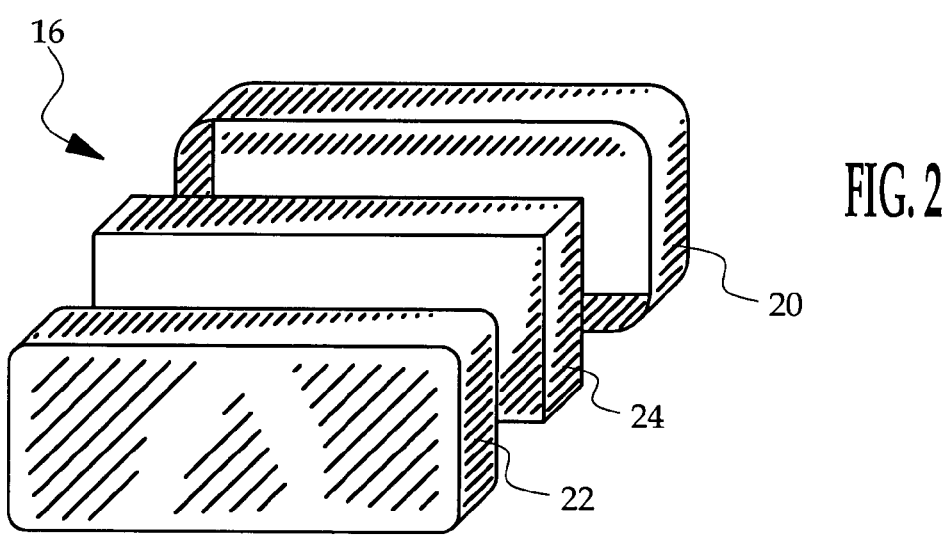
FIG. 2 is an exploded view of the rear view mirror/video display of FIG. 1.

Referring to FIG. 2, the rear view display apparatus 16 comprises a housing 20 adjustably supported on or above the windshield 18 as mentioned above in respect to FIG. 1, a one-way mirror 22 and a high brightness video display 24 such as a AMLCD, CRT or OLED display. The housing has an opening facing into the passenger compartment, the mirror 22 is captured in the opening of housing 20, and the video display 24 is mounted in the housing 20 immediately behind (i.e., inboard with respect to) the mirror 22. The rear view display apparatus 16 is selectively operable in one of two modes: a default mode in which a reflected view rearward of the vehicle 10 is provided by the one-way mirror 22, and a video imaging mode in which the view rearward of the vehicle 10 is provided by the video display 24, which the driver sees through the one-way mirror 22.

While the rearward field of view observable to a driver of the vehicle 10 in the default mode is typically partially obstructed by various vehicle body panels surrounding the back glass 14, such as the roof 26 and the C-pillars 28, 30, the field of view presented to the driver in the video imaging mode is essentially unobstructed due to the mounting position of the imaging device 12, affording the driver a superior view of objects rearward of the vehicle. According to this invention, the imaging device 12 is designed so that the image content (i.e., the field of view) presented to the driver by video display 24 in the video imaging mode is essentially the same as that provided by the one-way mirror 22 in the default mode. Preferably, this is achieved simply by determining the field of view of the mirror 22, and fitting the imaging device 12 with fixed lens elements that provide an equivalent effective field of view. Alternatively, optical and/or digital zoom functions can be utilized.

Figure 3:
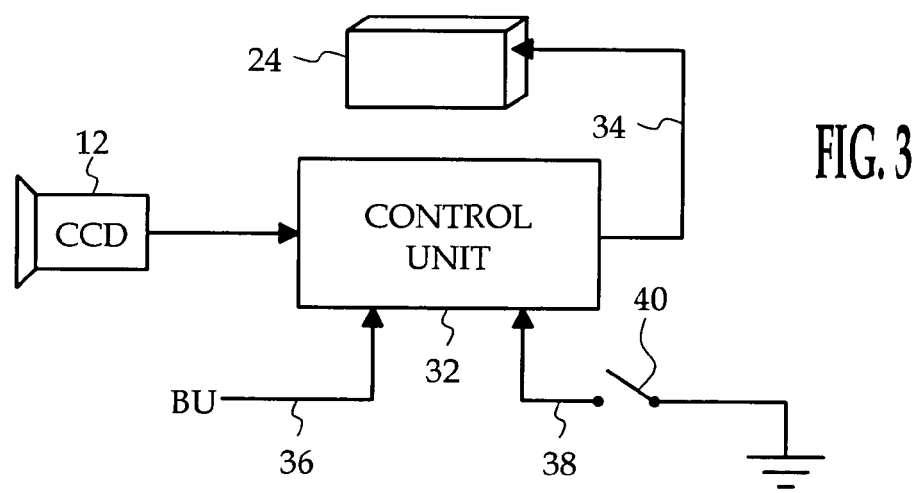
FIG. 3 is a block diagram of a controller for activating and deactivating the rear view mirror/video display of FIGS. 1-2.

The block diagram of FIG. 3 illustrates a control of the rear view video display 24. A control unit 32, which may be mounted in the housing 20 behind the video display 24, receives video data from the imaging device 12, and supplies a corresponding video drive signal to video display 24 via line 34 during the video imaging mode. Other inputs to control unit 32 include a backup (BU) input on line 36 and a driver toggle input on line 38. The BU input is active when the reverse range of the vehicle transmission is selected, and is used by control unit 32 to automatically activate the video display 24 to engage the video imaging mode; when a range other than reverse is selected, the BU input is not active, and the control unit 32 deactivates the video display 24 to engage the default mode. The driver toggle input on line 38 is produced by a momentary switch 40, and is used by control unit 32 to change the display mode (that is, from the default mode to the video imaging mode, or vice-versa) regardless of the state of the BU input on line 36. The switch 40 may be located on the mirror housing 20, on a transmission range selector of the vehicle, or in any other location conveniently accessed by the driver. The control unit 32 may perform other related functions such as controlling the display brightness, and may be user-programmable to suit the preferences of any given driver or set of drivers.

In summary, the rear view apparatus of the present invention utilizes video imaging in a framework and format that is consistent with the rear view image presented to the driver by a conventional rear view mirror. Various inputs allow manual or automatic selection of the viewing mode, and the one-to-one matching of the content of the displayed video image with that reflected by the mirror 22 facilitates a comfortable and convenient transition between viewing modes.

While the present invention has been described with respect to the illustrated embodiment, it is recognized that numerous modifications and variations in addition to those mentioned herein will occur to those skilled in the art. For example, the invention may be applied to various different vehicle body styles, the imaging device 12 may be placed in other locations, displays other than those mentioned herein may be utilized, the imaging device may include near infrared imaging, far infrared imaging and visible spectrum imaging, and so on. Accordingly, it is intended that the invention not be limited to the disclosed embodiment, but that it have the full scope permitted by the language of the following claims.

The invention claimed is:

1. A rear view display apparatus for a vehicle comprising:
   a housing mounted on or near a windshield of the vehicle and having an opening facing into a passenger compartment of the vehicle;
   a one-way mirror captured in the opening of said housing so that a scene rearward of the vehicle is reflected to a driver of the vehicle by said one-way mirror;
   a video display device substantially equivalent in size and aspect ratio to said one-way mirror, and disposed in said housing immediately behind said one-way mirror so that when said video display device is activated to display a video image, the driver sees said video image through said one-way mirror;
   an imaging device mounted on a rear portion of the vehicle to produce video image signals responsive to said scene rearward of the vehicle; and
   control apparatus for receiving the video image signals produced by said imaging device and selectively activating said video display device based on the received video image signals to display a video image of said scene rearward of the vehicle having a field-of-view that matches a field-of-view provided to the driver by said one-way mirror.

2. The rear view display apparatus of claim 1, wherein said control apparatus receives a reverse input indicating whether said vehicle is being operated in reverse, and automatically activates said video display device based on the received video image signals when said reverse input indicates that said vehicle is being operated in reverse.

3. The rear view display apparatus of claim 2, wherein said control apparatus automatically deactivates said video display device when said reverse input indicates that said vehicle is not being operated in reverse.

4. The rear view display apparatus of claim 2, wherein said control unit receives a manual switch input, and changes an activation state of said video display device without regard to said reverse input on activation of said manual switch input.

\* \* \* \* \*